United States Patent
Balatoni et al.

(10) Patent No.: US 6,282,204 B1
(45) Date of Patent: *Aug. 28, 2001

(54) ISDN PLUS VOICE MULTIPLEXER SYSTEM

(75) Inventors: Nicholas A. Balatoni, Santa Clara; Francis I. Akers, San Mateo, both of CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/995,244

(22) Filed: Dec. 19, 1997

(Under 37 CFR 1.47)

(51) Int. Cl.[7] .................................................. H04L 12/56
(52) U.S. Cl. ......................... 370/421; 370/463; 370/524; 370/228
(58) Field of Search .................. 375/260; 370/419, 370/420, 421, 465, 463, 466, 538, 914, 522, 524, 219, 228

(56) References Cited

U.S. PATENT DOCUMENTS

| | | |
|---|---|---|
| 3,308,240 | 3/1967 | Von Sanden . |
| 3,510,584 | 5/1970 | Krasin et al. ........................ 179/2.5 |
| 3,660,606 | 5/1972 | De Witt ................................. 370/80 |
| 3,711,650 | 1/1973 | Kuhn et al. . |
| 3,824,597 | 7/1974 | Berg . |
| 3,851,106 | 11/1974 | Jacobaeus . |

(List continued on next page.)

FOREIGN PATENT DOCUMENTS

| | | | |
|---|---|---|---|
| 0 087 265 A1 | 8/1983 | (EP) . | |
| 0 173 984 A2 | 3/1986 | (EP) | ............................. H04Q/11/04 |
| 0 227 164 A2 | 7/1987 | (EP) . | |
| 0 251 986 A2 | 1/1988 | (EP) | ................................ H04Q/5/02 |
| 0 260 470 A3 | 3/1988 | (EP) . | |
| 0 370 423 A2 | 5/1990 | (EP) . | |
| 59-70395 | 10/1982 | (JP) . | |
| 59-211366 | 5/1983 | (JP) . | |
| 61-45699 | 8/1984 | (JP) . | |
| 62-159561 | 1/1986 | (JP) . | |
| WO 85/02960 | 7/1985 | (WO) . | |
| WO 91/01600 | 2/1991 | (WO) | ............................. H04J/3/04 |
| WO 95/01600 | 2/1991 | (WO) . | |

OTHER PUBLICATIONS

Wildman, Bruce R., "Electronic Equipment—Survival In The Outside Plant," *Unknown publication source,* believed to have been published on or before Dec. 1988, pp. 629–630.

(List continued on next page.)

*Primary Examiner*—Chau Nguyen
*Assistant Examiner*—Phuongchau Ba Nguyen (57) ABSTRACT

A method and related apparatus for concurrent transmission and reception of at least one analog voice telephone signal and at least one ISDN service signal between a first location and a second location over a single twisted pair using a digitally encoded signal that is selected from the group consisting of 2B1Q and 4B3T signals. The method further includes the steps of sending line power over the single twisted pair, transferring the digitally encoded signal to the second location over the single twisted pair, and detecting non-operation of the digitally encoded signal between the first location and the second location to thereby impose a bypass lifeline and provide the analog telephone signal at the second location over the single twisted pair. The method also includes the step of providing the ISDN signal and the analog telephone signal at the second location over the single twisted pair when the non-operation is not detected. The present method and apparatus can provide at least a 2-to-1 pair gain by multiplexing signals representing the analog voice telephone signal and ISDN service signal, in a specific embodiment.

20 Claims, 7 Drawing Sheets

U.S. PATENT DOCUMENTS

| | | | |
|---|---|---|---|
| 3,922,493 | 11/1975 | Brenig et al. | 370/110.1 |
| 3,936,602 | 2/1976 | Korver | 178/58 R |
| 4,001,514 | 1/1977 | Wurst | 179/18 FC |
| 4,078,159 | 3/1978 | Lender et al. | |
| 4,100,377 | 7/1978 | Flanagan | |
| 4,112,427 | 9/1978 | Höfer et al. | |
| 4,145,574 | 3/1979 | Wintzer | |
| 4,351,049 | 9/1982 | Nobis | 370/62 |
| 4,381,427 | 4/1983 | Cheal et al. | 179/2 DP |
| 4,398,284 | 8/1983 | Canniff | |
| 4,417,333 | 11/1983 | Cochennec | 370/66 |
| 4,519,073 | 5/1985 | Bertocci et al. | |
| 4,577,315 | 3/1986 | Otsuka | |
| 4,578,538 | 3/1986 | Pascucci et al. | |
| 4,642,805 | 2/1987 | Dumas et al. | 370/58 |
| 4,644,527 | 2/1987 | Anderson et al. | 370/58 |
| 4,689,789 | 8/1987 | Herger | |
| 4,698,801 | 10/1987 | Hatano et al. | |
| 4,712,210 | 12/1987 | Davis et al. | |
| 4,740,963 | 4/1988 | Eckley | 370/110.1 |
| 4,745,624 | 5/1988 | Mantovani et al. | |
| 4,750,169 | 6/1988 | Carse et al. | 370/109 |
| 4,751,696 | 6/1988 | Black | 370/58 |
| 4,755,994 | 7/1988 | Staples et al. | |
| 4,771,418 | 9/1988 | Narasimhan et al. | |
| 4,788,680 | 11/1988 | Kikuchi et al. | |
| 4,901,344 | 2/1990 | Monette et al. | |
| 4,924,492 | 5/1990 | Gitlin et al. | 379/93 |
| 5,040,190 | 8/1991 | Smith et al. | |
| 5,111,497 | 5/1992 | Bliven et al. | 379/27 |
| 5,160,929 | 11/1992 | Costello | |
| 5,198,818 | 3/1993 | Samueli et al. | |
| 5,208,846 | 5/1993 | Hammond et al. | |
| 5,216,704 | 6/1993 | Williams et al. | |
| 5,255,317 | 10/1993 | Arai et al. | |
| 5,303,237 | 4/1994 | Gupta | |
| 5,369,696 | 11/1994 | Krauss et al. | |
| 5,375,122 | 12/1994 | Soupirot et al. | |
| 5,428,682 | 6/1995 | Apfel | |
| 5,453,989 | 9/1995 | Kitayama et al. | |
| 5,459,729 | 10/1995 | Bliven | 370/112 |
| 5,459,730 | 10/1995 | Bliven | 370/112 |
| 5,473,613 | 12/1995 | Bliven | 370/112 |
| 5,610,922 * | 3/1997 | Balatoni | 370/468 |
| 5,668,814 | 9/1997 | Balatoni | 370/540 |
| 5,751,741 * | 5/1998 | Voith et al. | 715/758 |
| 5,909,445 * | 6/1999 | Schneider | 370/468 |

OTHER PUBLICATIONS

Letter from Jeff Nash, "2BIQ, U–Interface Line Code Tutorial," *MITEL Semiconductor Product News*, Feb. 5, 1987.

Boyer, Gerald R., and Pitchford, Mark, "Universal Digital Channel (UDC)—Synergy With ISDN And The Second Main Line Application," *Unknown publication source*, believed to have been published on or before Dec. 1988, pp. 624–628.

Bell Communications Research, "Universal Digital Channel (UDC) Requirements And Objectives," *Technical Advisory TA–TSY–000398*, Issue 1, Sep. 1986.

Bell Communications Research, "ISDN Basic Access Digital Subscribers Lines," *Technical Advisory TA–TSY–000393*, Issue 1, Mar. 1987.

British Telecommunications PLC, "British Telecommunications Headquarters Specification RC 7328," Draft 2, received in commercial confidence on or about Apr. 1988.

"Application Note for 2B1Q Line Code Tutorial" *MITEL ST–BUS™MSAN–127*, 9161–001–040 NA, Issue 1, Jan. 1987.

"Application Note for Implementing an ISDN Architecture Using the ST–BUS" *MITEL MSAN–128*, 9161–001–042 NA, Issue 1, Mar. 1987.

"Application Note for Time Space Switching of 8, 16 or 32 K Bps Channels Using the MT8980"*MITEL MSAN–129*, 9161–001–044 NA, Issue 1, Apr. 1987.

"Application Note for Implementation Details of the MT8930 S/T Interface" *MITEL MSAN–130*, 9161–001–045 NA, Issue 1, Oct. 1988.

International Telecommunication Union, "Digital Networks, Digital Sections And Digital Line Systems," *CCITT Blue Book*, Recommendations G.801–G.961, vol. III, IXth Plenary Assembly, Melbourne, Nov. 14–25, 1988.

Hewett, Les and Pitchford, Mark, "Making the Transition: Fiber Winds Its Way Home," *Telephony*, Feb. 15, 1988, pp. 34–39.

Pacific Bell, Nevada Bell, "Requirements and Objectives for Digital Added Main Line (DAML)," *Technical Reference*, PUB–L–780057–PB/NB, Issue 1, May 1989.

Bell Communications Research, "General Requirements for ISDN Basic Access Digital Subscriber Lines," *Technical Reference TR–NWT–000393*, Issue 2, Jan. 1991.

Motorola, "ISDN U–Interface Transceiver," Document MC145572/D, Oct. 1995, 22 pages.

Baines, Rupert, "ADSL Community Faces Line Code Challenge," Electronic News, May 5, 1997, p. 48.

Knight, Stefan, "ADSL On Fast Track To Revolutionize Work World," *Electronic News*, May 5, 1997, pp. 43 and 46.

Hering, Uwe, "Market To Support Several Implementations of xDSL," *Electronic News*, May 5, 1997, pp. 56 and 73.

Kaiser et al., "Digital Two–Wire Local Connection Providing Office Subscribers with Speech, Data and New Teleinformation Services," ISSLS, Mar. 20–24, 1978, pp. 126–130.

Klodt, Bob, "Two Terminals for DMS–1," *Telesis*, Aug. 1977, pp. 107–112.

M. Fukuda et al., "An Approach to LSI Implementation of a 2B1Q Coded Echo Canceler for ISDN Subscriber Loop Transmission," IEEE International Conference on Communications BOSTICC/89, Boston, Massachusetts, Jun. 11–14, 1989, vol. 1, pp. 233–238.

Optilink Corporation, "PAIRSPAN–2 Digital Subscriber Carrier System Product Line Description,": Jul. 20, 1989, 12 pages.

Optilink Corporation, "Pairspan–2 Two Line Digital Carrier System," 1989, 4 pages.

Pacific Bell Request for Quote, Jun. 14, 1989, 54 pages.

Bell Atlantic Network Services, Inc., RFQ™90BGP0018, 55 pages.

"Leading Edge Access," *Eastern Communications Forum 88*, May 2–4, 1988, Rye Brook, New York, 21 pages.

Advertising materials for "DuaLine System" (1990) Rockwell International, 6 pages.

Advertising materials for "DigiLoop" (Undated) ECI Telecom, 5 pages.

Advertising materials for "DAML–100" (Undated) Wheelock, Inc., 2 pages.

Advertising materials for "Pairgain2 Digital Pair Saver" (Undated( PairGain Technologies, Inc., 4 pages.

ANSI, *Integrated Services Digital Network (ISDN) Basic Access Interface for Use on Metallic Loops for Application on the Network Side of the NT* (1988), pp. 15–77.

"Requirements and Objectives for Digital Added Main Line (DAML)," Pacific Bell PUB L–780057–B/NB, Issue 1, May 1989, pp. i–iii and 1—1 to 9–3.

Bellamy, *Digital Telephony*, Chapters 1 and 2, John Wiley & Sons, 1982, pp. 1–82.

Gerwin et al., "Dual Digital Transmission System for Multipair Cables Based on Crank–Shaft Coding" *Electronics Letters*, Jul. 19, 1984, vol. 20, No. 15, pp. 619–621.

Kawakami et al., "Improved Subscriber Loop Multiplexing Systems for Rural Areas," *Japan Telecommunications Review*, Apr. 1978, pp. 125–132.

Siemens, *Dual Channel Codec Filter (SICOFI®2) PEB 2260*, Data Sheet, Rev. 1.0, Siemens AG (Jan. 1989).

Siemens, *ISDN Communication Controller (ICC) PEB 2070 Data Sheet, Rev. 3.0*, (Jul. 1988).

Siemens, *Telecommunications Data Book 1987*, pp. 5–20 to 5–21.

Pacific Bell Request for Quote, RFQ™N96–NET–0049, Aug. 16, 1996, 135 pages.

Pacific Bell Request for Quote, RFQ™N95–NET–0063, Aug. 4, 1995, 37 pages.

* cited by examiner

ISDN PLUS VOICE MULTIPLEXER SYSTEM

A portion of the disclosure of this patent document contains material which is subject to copyright protection. The copyright owner has no objections to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of data and voice frequency communications. By way of example, the present invention is illustrated as a method and apparatus for transmitting and receiving an integrated services digital network (ISDN) 2B+D signal and voice channel over a single twisted pair telephone line.

Techniques for the transmission of multiple voice or data signals via ISDN are well known in the telecommunications industry. An increasing amount of subscribers often desire the use of such conventional ISDN for electronic data processing equipment such as telephones, computers, facsimile machines, modems, and the like in order to take advantage of video conferencing, Internet browsing and access as well as telephone service. However, telephone companies have been reluctant to offer ISDN services for a number of reasons.

One limitation with the provision of conventional ISDN service is that standard ISDN equipment (NT1 device) may experience failure and then leave subscribers without plain old telephone services (POTS). Standard ISDN equipment provides 2B+D (Basic Rate ISDN framing format with 2 basic or bearer (B) channels and 1 data (D) channel) digital services, with both B channels being used to provide data, both B channels being used to provide voice channels, or one B channel being used to provide data and another B channel being used to provide a voice channel. Standard ISDN equipment may thus be used to provide voice telephone service in addition to other digital services, but failure of the ISDN equipment results in failure of all services including the voice telephone service. Therefore, when ISDN service fails, digital telephone service fails with it. It is often desired to have POTS at a customer/subscriber premises as a "back-up" or "lifeline" service when the conventional ISDN service fails due to ISDN equipment failure or a power outage at the subscriber premises. However, providing this analog phone service conventionally requires adding an additional copper twisted pair line onto a subscriber premises, which may be difficult, costly, and time consuming. That is, because copper is a limited and expensive telephone company resource that may not be available at the desired customer premises, adding an analog telephone line may require breaking concrete and laying down additional copper cable which requires great time and expense.

From the above, it is seen that a method and apparatus for providing ISDN service and voice "lifeline" telephone service from a telephone company central office to a subscriber premises over pre-existing copper wires is desirable.

SUMMARY OF THE INVENTION

The present invention relates to the field of ISDN and telephone communications. More particularly, the present invention provides a method and related apparatus for transmitting and receiving ISDN and POTS information between a central office and subscriber premises over a single twisted pair line, thereby providing a 2:1 pair gain savings in addition to pair gain savings achieved from using ISDN.

According to a specific embodiment, the present invention provides a method of concurrently transmitting and receiving signals representing a voice channel and an ISDN (2B+D) service over a single twisted pair between a first location and a second location. The method includes steps of providing an analog telephone signal and an ISDN signal at a first location, converting the analog telephone signal into a first binary signal, combining the first binary signal and the ISDN signal to a higher rate multiplexed binary signal, and converting the higher rate multiplexed binary signal into a digitally encoded signal. The digitally encoded signal is selected from the group consisting of 2B1Q and 4B3T signals. The method further includes the steps of sending line power over the single twisted pair, transferring the digitally encoded signal to the second location over the single twisted pair, and detecting non-operation of the digitally encoded signal between the first location and the second location to thereby impose a bypass lifeline and provide the analog telephone signal at the second location over the single twisted pair. The method also includes the step of providing the ISDN signal and the analog telephone signal at the second location over the single twisted pair when the non-operation is not detected.

A further understanding of the nature and advantages of this and other specific embodiments of present invention may be realized by reference to the latter portions of the specification and attached drawings.

BRIEF DESCRIPTION OF THE DRAWINGS

FIG. 2 is a simplified block diagram for an ISDN plus voice multiplexer line card (LC) 15, according to a specific embodiment of the present invention;

DETAILED DESCRIPTION OF THE SPECIFIC EMBODIMENTS

I. General

II. Data Transmission Hardware

A. ISDN Plus Voice LC Hardware
B. ISDN Plus Voice RT Hardware
C. ISDN Plus Voice LC/RT Components
III. Software/Microprocessor Functionality
IV. Bypass to POTS
V. Conclusion I. General According to a specific embodiment, the present ISDN plus voice multiplexer system delivers at least 3B+D (in particular, 2B+D ISDN service and an analog voice channel B) from a telephone company central office to a subscriber premises such as a home, business or the like over a single twisted pair 25. The specific embodiment provides a 2-to-1 pair gain over conventional ISDN service provided over a first twisted pair and a separate analog voice channel over a second twisted pair, and leads to better efficiency in the deployment of copper and the like. It should be noted that the present invention is not limited by way of the ISDN plus voice embodiments described specifically below, and that one of ordinary skill in the art will easily recognize other practical implementations of the invention described herein. Accordingly, the claims of the present invention are not necessarily limited to the embodiments as described herein.

Figure 1:
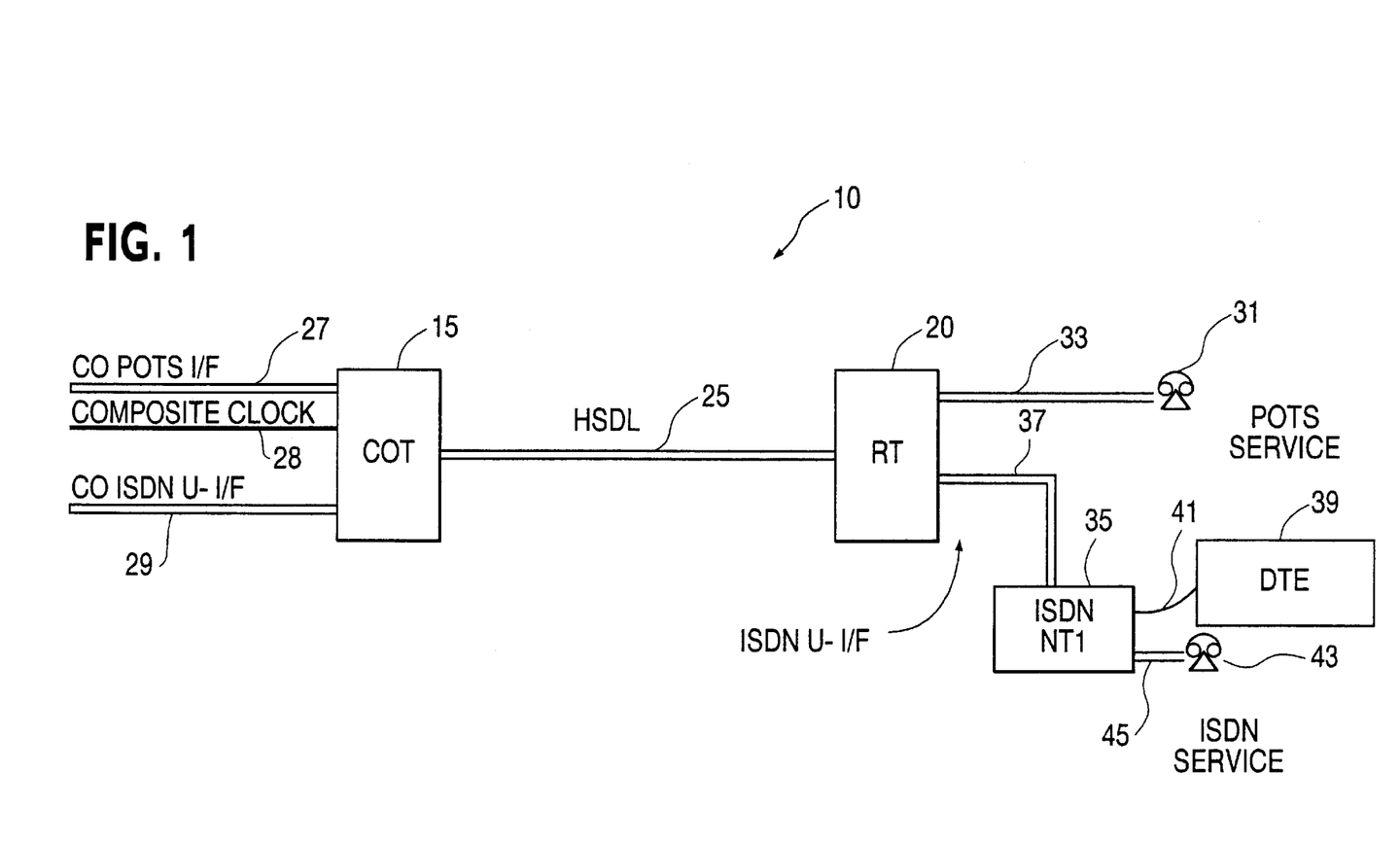
FIG. 1 is a general block diagram for the ISDN plus voice multiplexer system 10 according to the present invention.

FIG. 1 is a general block diagram for a 3B+D ISDN plus voice multiplexer system 10 according to an embodiment of the present invention. Multiplexer system 10, which includes a central office terminal (COT) or line card (LC) 15 and remote terminal (RT) 20, is deployed over a single twisted pair 25 between a telephone company location (e.g., central office) and a customer premises. LC 15, located at the central office, is coupled via the 2-wire high-speed digital subscriber loop (HDSL) 25 to RT 20 located at the customer premises (e.g., in the home or office) or nearby (e.g., installed in an enclosure near but outside the home or office) the customer premises. HDSL 25 between LC 15 and RT 20 transmits multiplexed ISDN and voice channel data at about 218 kilobits per second (kbps) using a 2B1Q coding format (at about 109 kbaud symbol rate for 2B1Q format), for a typical 17 kilofeet or greater mixed gauge line span. In alternative embodiments, the digital data format may be 4B3T and others. At the central office, LC 15 is coupled to a switch where conventional analog telephone signals may be provided via twisted pair line 27 (POTS interface) from the switch and ISDN signals may be provided via twisted pair line 29 (ISDN U-interface) from the switch. LC 15 is also coupled to receive a composite clock signal 28 from the central office. At the customer premises, RT 20 is coupled to subscriber equipment 31 (such as an analog telephone) via a twisted pair 33 and also to an ISDN NT1 device 35 via a twisted pair ISDN digital subscriber line (ISDN DSL) 37. In the specific embodiment, ISDN NT1 device 35 is also coupled to a data terminal equipment (DTE) 39 via a twisted pair line 41 and to subscriber equipment 43 (e.g., a digital telephone) via twisted pair line 45. In other specific embodiments, ISDN NT1 device 35 may be coupled to DTE 39 via twisted pair line 41 and to another DTE via twisted pair line 45, or to subscriber equipment 43 via twisted pair line 45 and to another subscriber equipment via twisted pair line 41.

In the present invention, the POTS channel, the POTS signalling information, the 2B channels for ISDN, and the D bits and M bits for ISDN are put into a packet by LC 10 in the downstream direction. LC 10 appends a synchronization word at the beginning of the packet and cyclic redundancy check (CRC) bytes at the end of the packet before sending the packet downstream from the central office location over the single twisted pair 25 for use by RT 20 at the subscriber location. At RT 20, the received packet is examined for the synchronization word and, if found, the CRC bytes are then examined for errors. The remaining portions of the packet are then properly distributed to the POTS and ISDN U-interface of RT 20, with the POTS signalling and the ISDN M bits being examined and processed by the processor in RT 20. The upstream flow is similar to the downstream flow but in reverse. At RT 20, the POTS channel, the POTS signalling information, the 2B channels for ISDN, and the D bits and M bits for ISDN from the subscriber are put into a packet by RT 10 in the upstream direction. RT 20 appends a synchronization word at the beginning of the packet and cyclic redundancy check (CRC) bytes at the end of the packet before sending the packet upstream from the subscriber location over the single twisted pair 25 for use by LC 10 at the telephone company location. At LC 10, the received packet is examined for the synchronization word and, if found, the CRC bytes are then examined for errors. The remaining portions of the packet are then properly distributed to the POTS and ISDN U-interface of LC 10, with the POTS signalling and the ISDN M bits being examined and processed by the processor in LC 10.

As seen in FIG. 1, the main timing source for the ISDN plus voice multiplexer system 10 comes from the composite clock provided by the central office. As described in more detail below, the HDSL line 25 is driven by this clock source on LC 10, and RT 20 recovers this clock from HDSL 25 in order to drive the ISDN U-interface and the POTS line from a clock synchronized to the recovered clock signal. It is recognized that the composite clock and the ISDN U-interface from the central office are synchronized to the same clock.

II. Data Transmission Hardware

A. LC Hardware

FIG. 2 is a simplified block diagram for LC 15 according to a specific embodiment of the present invention. LC 15 interfaces with analog signals via twisted pair line 27 and with ISDN signals via twisted pair line 29 at the central office location. LC 15 includes a hybrid transformer 101, a codec (coder-decoder) filter, a DSL transformer 105, an ISDN transceiver circuit 107, a clocking circuit 109, a multiplexer/framer circuit 111, an HDSL transceiver circuit 113, a microprocessor 115, an HDSL transformer 117, and an HDSL power circuit 119, among other elements. The ISDN plus voice LC 15 will be first described in reference to outgoing ISDN and analog signals from a telephone company location, such as the central office, toward the subscriber location.

Two-wire analog signals such as voice and the like are provided from the telephone company equipment (e.g., a central office) via a twisted pair 27 (one wire is tip or "T", and the other wire is ring or "R") to LC 15. Hybrid transformer 101 converts the analog signals from a 2-wire format into a 4-wire format (as well as 4-wire format to 2-wire format as necessary in the opposite direction) for provision to codec filter 103. Hybrid transformer 101 isolates, conditions, impedance matches, and separates the outgoing analog signals into send-direction (in the direction from LC 15 towards RT 20) and receive-direction signals (in the direction from RT 20 towards LC 15) for transmission to and from codec filter 103 over a twisted pair line 131 and a twisted pair line 133, respectively. Buffer amplifiers 135 and 137 may be provided to amplify the send-direction and receive-direction signals on lines 131 and 133, respectively.

Codec filter 103 converts the send-direction portion of the outgoing analog signal from hybrid transformer 101 into a pulse-code modulated (PCM) encoded digital signal using a sampling rate of 8,000 times per second with 8-bits per sample. The send-direction PCM encoded digital signal is a 64 kbps unipolar transistor-to-transistor logic (TTL) binary serial bit stream that exits codec filter 103 via a line 141 to multiplexer/framer circuit 111. Codec filter 103 also converts a receive-direction PCM encoded digital signal into the receive-direction signal of the outgoing analog signal in the other direction. The receive-direction PCM encoded digital signal is a 64 kbps unipolar TTL binary serial bit stream that enters codec filter 103 via line 143 from multiplexer/framer circuit 111. Codec filter 103 operates on a 2.048 Megahertz (MHz) clock signal provided on line 145 by clock circuit 109 (described in detail below) based on an 8 kilohertz (kHz) synchronization clock signal in clock circuit 109 extracted from the composite clock signal from the central office. Timing control signals are provided to codec filter 103 on line 147 by multiplexer/framer circuit 111 such that the 2.048 MHz clock signal provides the timing with 8 kHz (byte clock) synchronization for the send and receive operation of codec filter 103, and the 64 kHz (bit clock) timing for taking the values of the PCM encoded digital 8-bit words per sample, 8000 times per second. The signalling for the POTS voice channel is handled by microprocessor 115 over selected control lines (collectively shown as line 148 coupled to codec filter 103.

The 2-wire ISDN signal (ISDN DSL U-Interface) on twisted pair line 29 at the central office interfaces with LC 10 via DSL transformer 105. DSL transformer 105 converts the ISDN signal from a 2-wire format into a 4-wire format (as well as from 4-wire format to 2-wire format in the opposite direction as necessary). In particular, DSL transformer 105 separates the ISDN signal into send-direction and receive-direction signals for transmission to and from ISDN transceiver 107 over a twisted pair line 151 and a twisted pair line 153, respectively. DSL transformer 105 and surrounding resistive elements (not shown) also isolate, condition, and impedance match the 2-wire ISDN signal for use in ISDN transceiver 107.

ISDN transceiver 107 performs selected clock recovery and data formatting operations. In particular, ISDN transceiver 107 recovers a clock signal from the ISDN signal from DSL transformer 105. The recovered clock signal provides a 2.048 MHz clock and a frame synchronization clock of 8 kHz. ISDN transceiver 107 performs echo cancellation and adaptive equalization functions, as well as frame and bit synchronized clock recovery. In the specific embodiment, ISDN transceiver 107 may be a commercially available ISDN transceiver, such as a Motorola MC145572 configured as a NT master and used in an Interchip Digital Link (IDL) short frame 8-bit mode. In the downstream direction, a B1 byte, a B2 byte and 2 D bits from the ISDN signal received from DSL transformer 105 are transmitted by ISDN transceiver 107 to multiplexer/framer circuit 111 via twisted pair line 155. In addition, the 2.048 MHz IDL clock signal and 8 kHz IDL frame synchronization signal are sent to multiplexer/framer circuit 111 over lines 157 and 159, respectively. For the upstream direction, a B1 byte, B2 byte and 2 D bits, which are transmitted from the multiplexer/framer circuit 111 to ISDN transceiver 107 via line 161, are clocked by ISDN transceiver 107 using the 2.048 MHz clock signal. The M channel information is handled by microprocessor 115 over certain control lines 148 coupled to ISDN transceiver 107.

Figure 3A:
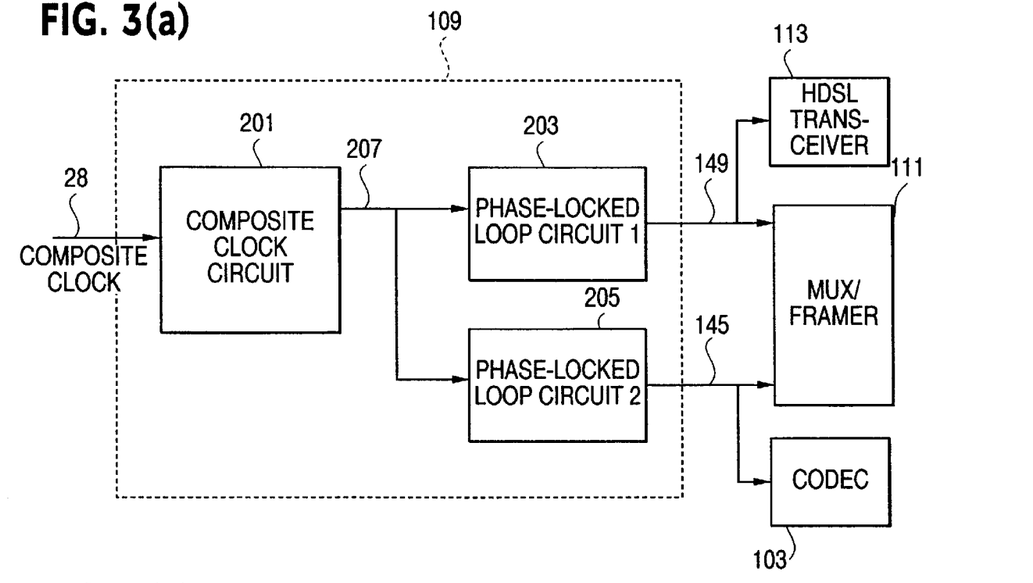
FIG. 3(a) is a simplified block diagram of clocking circuit 109 in LC 15, according to a specific embodiment of the present invention.

As mentioned above, LC 15 is coupled to receive a composite clock signal 28 from the central office. Composite clock signal 28 is a bipolar signal at 64 kHz. Every 8th clock time, a bipolar violation (e.g., two consecutive ones of the same polarity) is inserted in the 64 kHz signal producing a "composite" clock signal with a 64 kHz and a 8 kHz component. As seen in FIG. 3(a) which is a simplified block diagram of clocking circuit 109 in LC 15, the composite clock signal 28 of 64 kHz is received by a composite clock circuit 201 which retrieves a 8 kHz clock from the 8 kHz component of the composite clock signal 28. The 8 kHz clock signal is sent over line 207 and used by a first phase-locked loop (PLL) circuit 203 and a second phase-locked loop circuit 205. First PLL circuit 203 receives the 8 kHz clock signal and generates a 218 kHz signal. In addition to being sent for use to multiplexer/framer circuit 111, the 218 kHz signal output from first PLL circuit 203 via line 149 is the line rate used to drive the HDSL line 25. Second PLL circuit 205 also receives the 8 kHz clock signal and generates a 2.048 MHz clock signal output via line 145 to multiplexer/framer circuit 111 and to codec filter 103. In the specific embodiment of the present invention, the primary 2.048 MHz clock is the composite clock, with a secondary backup clock being the 2.048 MHz clock recovered from the ISDN U-interface 29, in order to safeguard against LC 15 from losing clocking in the event that the ISDN line fails or is cut off. In some specific embodiments, a further backup clock may be provided by an independent clock source such as a crystal oscillator operating at the appropriate frequency. Therefore, the POTS line can be operational, independent of the status of the ISDN line.

As mentioned above, both ISDN transceiver 107 and clocking circuit 109 provide 2.048 MHz clock signals and 8 kHz synchronization signals to multiplexer/framer circuit 111, which provides data handling functions. In particular, multiplexer/framer circuit 111 receives the send-direction PCM encoded digital signal serially transmitted via line 141 from codec filter 103 and the send-direction ISDN 2B+D signal from ISDN transceiver 107 via line 155. In the other direction toward the central office, multiplexer/framer circuit 111 transmits the receive-direction PCM encoded digital signal in serial mode to codec filter 103 via line 143 and the receive-direction ISDN 2B+D signal to ISDN transceiver 107. Multiplexer/framer circuit 111 multiplexes the 64 kbps send-direction PCM encoded digital signal from codec filter 103 together with the 160 kbps ISDN signal from ISDN transceiver 107 into a multiplexed binary signal over line 163. Multiplexer/framer circuit 111 also demultiplexes the multiplexed binary signal received from the subscriber location into the 64 kbps receive-direction PCM encoded digital signal for use in codec filter 103 and the 160 kbps ISDN signal for use in ISDN transceiver 107. The 160 kbps ISDN signal includes 2B+D (two 64 kbps basic or bearer channels and a 16 kbps D channel plus 16 kbps of framing, as is well known). Monitor data, ring data, and other POTS signalling data (used for the voice channel to indicate idle, ringing, open, reverse battery detection, metering, off-hook/on-hook status, and the like (for example, remote terminal configuration, status request, various testing, and error checking messages)) are polled from codec filter 103 by microprocessor 115 via selected lines 148 coupled to codec filter 103.

Multiplexer/framer circuit 111 may be a custom integrated circuit chip (typically an application specific integrated circuit (ASIC) such as a gate array, a field programmable gate array, or the like). In the specific embodiment, the custom integrated circuit is a Xilinx 3000 Series Programmable Gate Array, but can also be a variety of other integrated circuit chips. Appendix I provides an equivalent schematic (Copyright, Unpublished Work, Raychem Corporation) for the Xilinx 3000 Series Programmable Gate Array functions for the ISDN plus voice LC 15 discussed herein, according to a specific embodiment. However, it would be noted by one of ordinary skill in the art that other types of integrated circuit(s) and the like may also be used. A specific embodiment of multiplexer/framer circuit 111 is described in more detail below.

Microprocessor 115 acts as the main controller of LC 15 and also performs various testing, status, and control functions. For example, status indications are provided by, for example, lights, alarms, or the like, under control of microprocessor 115. Microprocessor 115 is also coupled to control HDSL transceiver 113 via direct control leads 169. Additionally, microprocessor 115 oversees conventional Mechanized Loop Testing (MLT) functions, ISDN bypassing (discussed further below) for POTS lifeline service, line card power up and powering status, and alarm status, among others. Furthermore, when the ring detectors (not shown in FIG. 2) detect an incoming ring signal from lines 148, microprocessor 115 sends an appropriate ring signal encoded in the line control data so as to ring the line at RT 20. In one specific embodiment, microprocessor 115 may be a single microprocessor. However, in other specific embodiments, microprocessor 115 may be comprised of multiple, for example, two microprocessors with split or overlapping responsibilities (e.g., one microprocessor may handle telephony functions while another microprocessor handles the HDSL chip control).

Figure 3B:
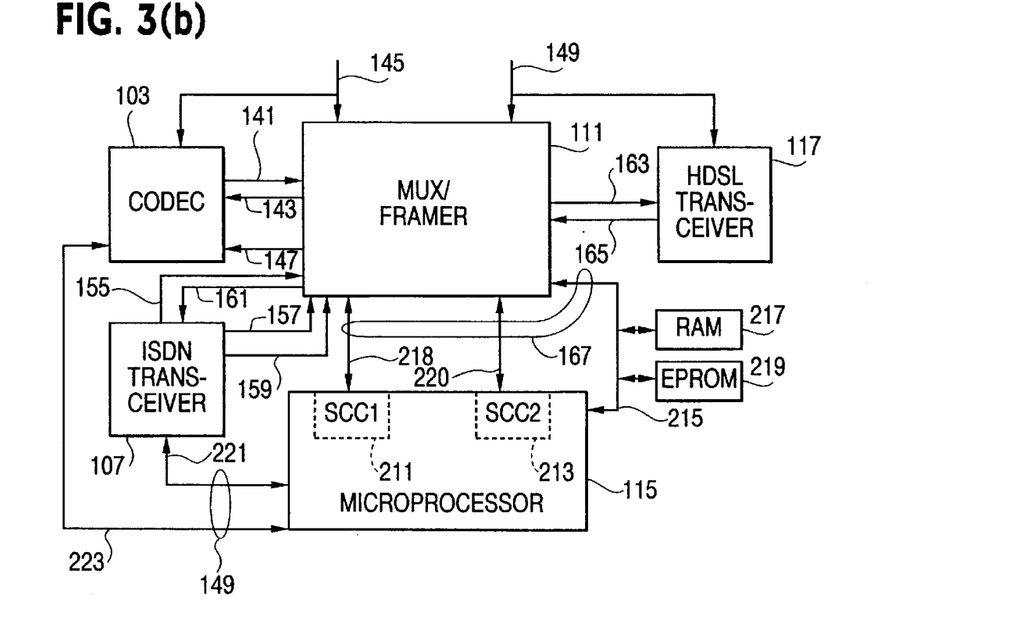
FIG. 3(b) is a block diagram showing additional details of microprocessor 115 and the control lines 167 and 148 in LC 15, according to a specific embodiment of the present invention.

In FIG. 2, line 167 connecting microprocessor with multiplexer/framer circuit 111 and line 148 connecting microprocessor 115 with ISDN transceiver 107 and codec filter 103 are simplified representations of the control lines between multiplexer/framer circuit 111, ISDN transceiver 107, codec filter 130 and microprocessor 115. FIG. 3(b) is a block diagram showing additional details of microprocessor 115 and the control lines 167 and 148. As shown in FIG. 3(b), microprocessor 115 includes a first serial communication controller (SCC1) 211 used as the serial interface to multiplexer/framer circuit 111, and a second serial communication controller (SCC2) 213 used as a serial pump. In the present invention, microprocessor 115 may be a commercially available processor (such as a Motorola MC68302 processor to handle telephony functions and an Intel 87C51FA processor to handle HDSL control), connected with a bus 215 to random access memory (RAM) 217, erasably-programmable read-only memory (EPROM) 219, and multiplexer/framer circuit 111 in the specific embodiment. Coupled to multiplexer/framer circuit 111 via line 218, SCC1 (programmed in the NMSI mode) 211 acts as the serial interface to multiplexer/framer circuit 111 where the B1 byte, B2 byte, D bits and the voice channel byte are all taken from multiplexer/framer circuit 111 and written into RAM 217 in the downstream direction (these bytes and bits also may be read from RAM 217 and written to the multiplexer/framer circuit 111 for signal flow in the opposite direction). In the downstream direction, microprocessor 115 also processes the ISDN M channel bits (received from ISDN transceiver via line 221) and the POTS signalling bits (received from codec filter 103 via line 223), which are written into RAM 217. In the upstream direction, these bits are read from RAM 217 and processed by microprocessor 115. These multiple bytes and bits stored in RAM 217 are the constructed frame, which includes 96 bytes of B1, 96 bytes of B2, 12 bytes of D1, 12 bytes of D2, 96 bytes of POTS, 3 bytes of POTS signalling, and 6 bytes of M bits. Coupled to multiplexer/framer circuit 111 via line 220, SCC2 213, used as a serial pump, reads the constructed frame from RAM 217 and writes the constructed to multiplexer/framer circuit 111 in the downstream direction (the constructed frame is read from multiplexer/framer circuit 111 and written to RAM 217 in the upstream direction).

Figure 3C:
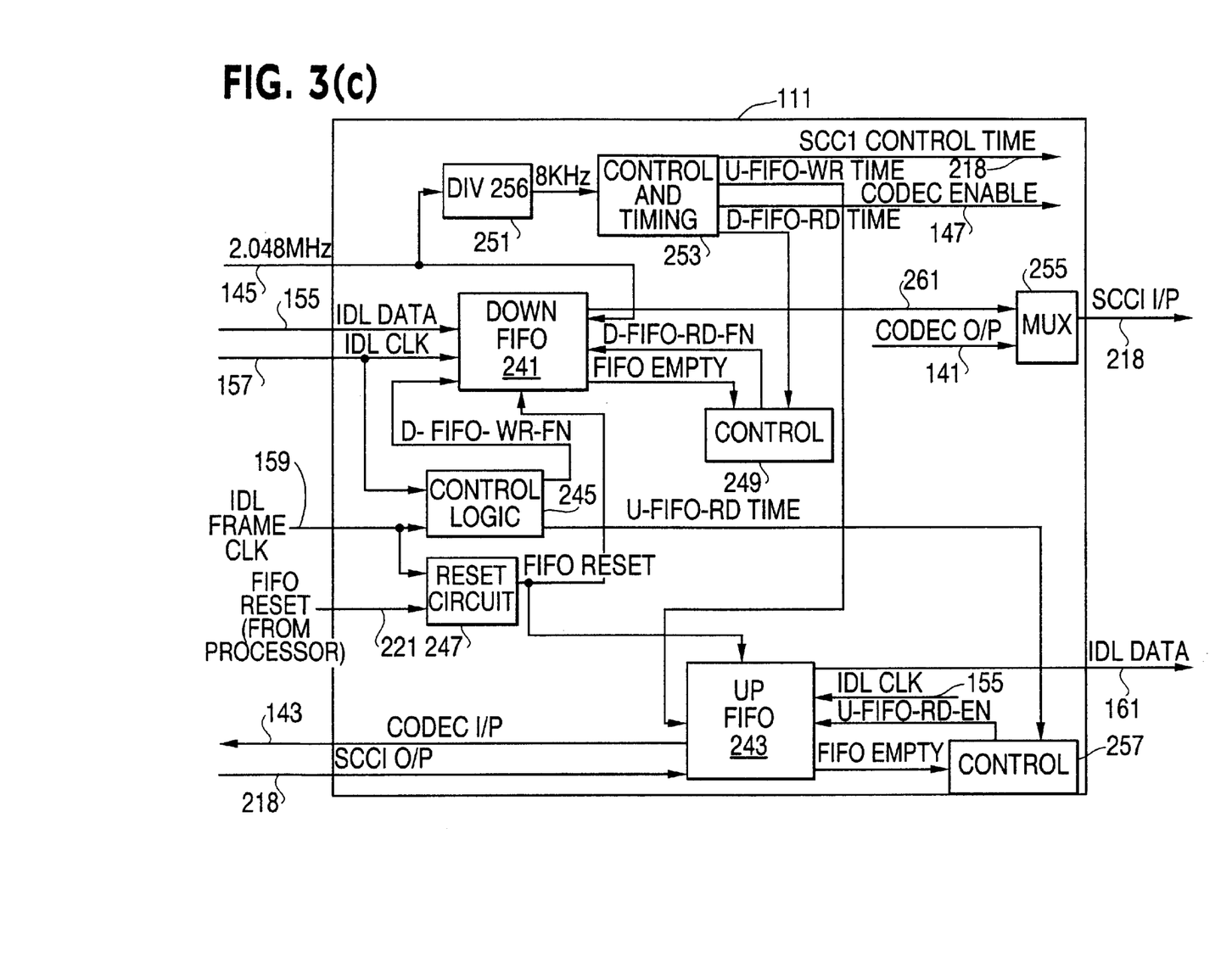
FIG. 3(c) is a detailed block diagram of the interface of multiplexer/framer circuit 111 to microprocessor 115 and ISDN transceiver 107 and to codec filter 103 in LC 15, according to a specific embodiment of the present invention.

Multiplexer/framer circuit 111 is described in more detail with reference to FIGS. 3(c)–3(d). FIG. 3(c) is a detailed block diagram of the interface of multiplexer/framer circuit 111 to microprocessor 115 and ISDN transceiver 107 and to codec filter 103. As seen in FIG. 3(c), multiplexer/framer circuit 111 includes a downstream first-in-first-out (Down-FIFO) circuit 241, an upstream FIFO (Up-FIFO) circuit 243, a first control logic block 245, a reset circuit 247, a second control logic block 249, a divider circuit 251, a control and timing block 253, a multiplexer 255, and a third control block 257. In general, the interface between ISDN transceiver 107 and multiplexer/framer circuit 111 is clocked with the recovered 2.048 MHz clock from the ISDN signal at appropriate times such that the B1, B2 and D bits are selected from line 155 for downstream flow from ISDN transceiver 107 to multiplexer/framer circuit 111 (or selected onto line 161 for upstream flow from multiplexer/framer circuit 111 to ISDN transceiver 107). In multiplexer/framer circuit 111, the 2.048 MHz clock signal 145 generated by second PLL circuit 205 is synchronized with the recovered 2.048 MHz clock signal 157. ISDN transceiver 107 via lines 155 and 161 communicates with a FIFO circuit 241 or 243 (via line 155 and with Down-FIFO 241 if in the downstream direction, or via line 161 and with Up-FIFO 243 if in the upstream direction) in order to compensate for the unknown phase difference between these clock signals 145 and 157. For the downstream direction, multiplexer 255 multiplexes the voice channel data output from line 141 of codec filter 103 with an output 261 (ISDN data) from Down-FIFO 241, in order to send the multiplexed output to microprocessor 115 via SCC1 211. For the downstream direction, SCC1 211 of microprocessor 115 is read and at the appropriate time, the voice channel data is sent to codec filter 103 via line 143 and ISDN data is sent to Up-FIFO circuit 243 and provided to ISDN transceiver 107 via line 161. The output of ISDN data from Up-FIFO circuit 243 is clocked with the recovered 2.048 MHz clock signal 157. Divider circuit 251 divides the 2.048 MHz clock signal 145 by 256 to provide an 8 kHz clock for control and timing block 253, which provides synchronization for controlling the reading/writing off/onto line 218 to SCC1 211. Control and timing block 253 also enables input of voice channel data from codec filter 103 via line 141 and of ISDN data from ISDN transceiver 107 via line 155 to multiplexer 255 of multiplexer/framer circuit 111, and enables output of voice channel data to line 143 of codec filter 103 and of ISDN data to ISDN transceiver 107 via line 161 from Up-FIFO circuit 243. When ISDN service is operational, first and third control logic blocks 245 and 257 coordinate the timing and operation of FIFOs 241 and 243, based on the 2.048 MHz IDL clock signal 157 recovered from the ISDN signal. However, if ISDN service becomes non-operational, second and third control logic blocks 249 and 257 coordinate the timing and operation of FIFOs 241 and 243, based on the provision of 2.048 MHz clock signal 145 from the composite clock signal 28 received from the central office. For both the downstream and upstream directions, reset circuit 247 ensures the proper start time for the FIFOs such that the FIFOs are reset and started at a time when it is not B1, B2 or D time. This start time ensures that the first bit of data written to the FIFO is bit 1 of B1. For both the downstream and upstream directions, the appropriate FIFO may only be read if it is not empty, with the FIFO read signal being enabled at a time such that the first data read out of a FIFO is bit 1 of B1 at the read frame time. It is recognized that other circuits (e.g., shift registers, etc.) in place of or in addition to the FIFOs of the specific embodiment may be utilized in the present invention.

Figure 3D:
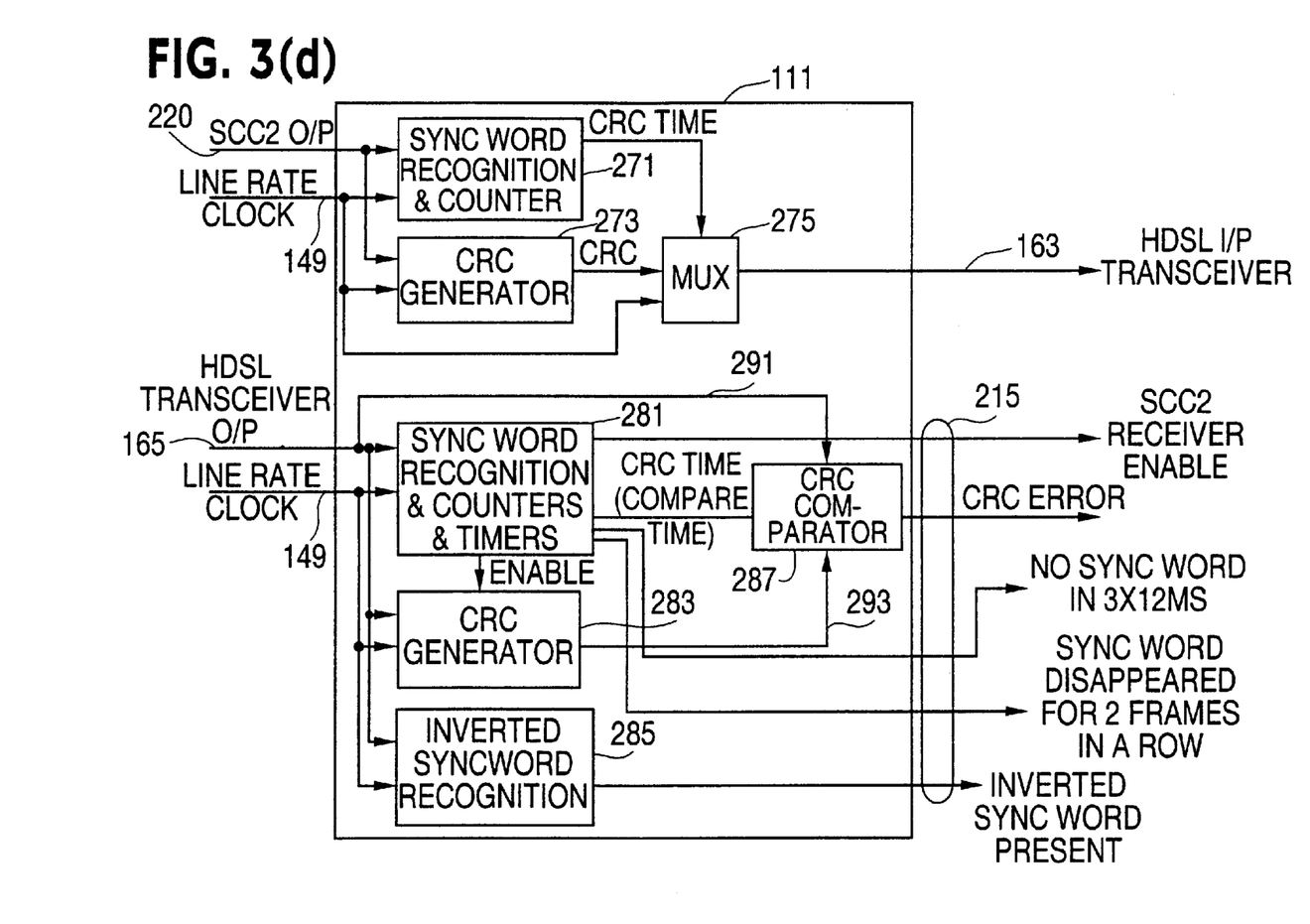
FIG. 3(d) is a detailed block diagram of the interface of multiplexer/framer circuit 111 to microprocessor 115 and HDSL transceiver 113 in LC 15, according to a specific embodiment of the present invention.

FIG. 3(d) is a detailed block diagram of the interface of multiplexer/framer circuit 111 to microprocessor 115 and HDSL transceiver 113 in LC 15. However, it is noted that the block diagram of FIG. 3(d) is common to both LC 15 and RT 20 and will be explained with respect to LC 15 to avoid undue repetition in description. As mentioned above, LC 10 appends a synchronization word at the beginning of the packet and CRC bytes at the end of the packet before sending the packet downstream from the central office location over the single twisted pair 25 for use by RT 20 at the subscriber location. At RT 20, the received packet is examined for synchronization word and, if found, the CRC bytes are then examined for errors. The remaining portions of the packet are then properly distributed to the POTS and ISDN U-interface of RT 20, with the POTS signalling and the ISDN M bits being examined and processed by the processor in RT 20. The upstream flow is similar to the downstream flow but in reverse. The synchronization and error checking is performed by multiplexer/framer circuit 111, as seen in FIG. 3(d). Multiplexer/framer circuit 111 includes a first sync word recognition/counter circuit 271, a first CRC generator 273, a multiplexer 275, a second sync word recognition/counter/timer circuit 281, a second CRC generator 283, an inverted sync word recognition circuit 285, and a CRC comparator 287. In the downstream direction, data output on SCC2 213 of microprocessor 115 is fed via line 220 to first sync word recognition/counter circuit 271 where a sync word is recognized and used to calculate the CRC time. This data also is fed to first CRC generator 273, which calculates the CRC on the packet and inserts the CRC at the end of the packet, as signalled by the CRC time signal. The output data with CRC is then sent to HDSL transceiver 113 via line 163. The above-described operation of FIG. 3(d) occurs in the downstream direction in LC 15 and similarly occurs in RT 20 in the upstream direction. For LC 15 in the upstream direction, data coming from line 165 of HDSL transceiver 113 passes through second sync word recognition/counter/timer circuit 281, in addition to being sent to second CRC generator 283, to inverted sync word recognition circuit 285 and to CRC comparator 287 via line 291. Second sync word recognition/counter/timer/circuit 281 has two phases: initial synchronization and monitoring synchronization. Initiated by microprocessor 115 after HDSL transceiver 113 indicates a successful link with RT 20, initial synchronization is determined if a sync word or an inverted sync word is found within 36 milliseconds (ms). The framing algorithm used in second sync word recognition circuit 281 (or in inverted sync word recognition circuit 285) in the specific embodiment checks for three consecutive sync words (or inverted sync words) before declaring that a sync word (or an inverted sync word) has been found. Once the proper sync word has been found (by either second sync word recognition circuit 281 or by inverted sync word recognition circuit 285), the proper CRC time is determined with the CRC time signal, and the received CRC from line 291 is compared by CRC comparator 287 with the calculated CRC from line 293. Monitoring synchronization is achieved by constantly checking that the expected sync word is at the proper time. In the event that the expected sync word is not received in 24 ms, an out-of-sync indication activates to interrupt microprocessor 115 and returns to the initial synchronization phase. This initial/monitoring synchronization occurs in LC 15 in the upstream direction and similarly occurs in RT 20 in the downstream direction.

HDSL transceiver 113 performs echo cancellation and adaptive equalization functions, as well as automatic polarity adaption, automatic gain control, and frame and bit synchronized clock recovery. Operating under the control of microprocessor 115, HDSL transceiver 113 receives the 218 kbps multiplexed (3B+D) binary signal from multiplexer/framer circuit 111 via line 163 for conversion into an outgoing digital 2B1Q signal sent to HDSL transformer 117. The outgoing digital 2B1Q signal is transmitted at an information rate of 218 kbps (i.e., a symbol rate of 109 kbaud, as a 2B1Q signal has four voltage levels with two bits of information encoded per level). HDSL transceiver 113 also converts an incoming digital 2B1Q signal from HDSL transformer 117 into the 218 kbps multiplexed binary signal received on line 165 by multiplexer/framer circuit 111. In the specific embodiment, HDSL transceiver 113 may be separately controlled by an Intel 87C51FA controller, 8051 controller or other controller. Of course, the invention may also be adapted to use, for example, a 4B3T digital signal at a 218 kbps information rate (i.e., a symbol rate of about 164 kbaud, as a 4B3T signal has three voltage levels with four bits of information encoded per level).

HDSL transceiver 113 sends the outgoing digital 2B1Q signal via twisted pair line 171 to HDSL transformer 117, and receives the incoming digital 2B1Q signal via twisted pair line 173 from HDSL transformer 117. HDSL transformer 117 performs a 4-wire to 2-wire conversion to condition and impedance match the digital 2B1Q signal for transmission over HDSL 25, which is a single twisted pair. The span of HDSL 25 may be up to at least about 17 kilo-feet on a 26 gauge twisted pair, and may even extend up to at least 28 kilo-feet and even greater on a thicker gauge twisted pair.

ISDN plus voice LC 15 also includes a HDSL power injection circuit 119 coupled to receive power from a power supply circuit for injection into HDSL 25 via a line 175 to HDSL transformer 117. In a specific embodiment, the power supply circuit receives –48 V and –48 V return telephone company battery power from the central office. The power supply circuit converts the telephone company battery power into about +100 V and –100 V for use by power injection circuit 119, and into about +/–5 V for supplying power to various portions of LC 15. Power injection circuit 119 receives and injects +100 V and –100 V from the power supply circuit into HDSL 25 via HDSL transformer 119, thereby line powering the ISDN plus voice RT 20 according to the specific embodiment. Of course, other embodiments of the invention may inject other than +100 V and –100 V return into HDSL 25.

Upstream signals received from HDSL 25 at the ISDN plus voice LC 15 are processed in a similar but reverse method as described for the outgoing signals primarily discussed above. In particular, an incoming 2B1Q signal from HDSL 25 enters HDSL transformer 117, which isolates, conditions, and impedance matches the incoming 2B1Q signal (which is at a 218 kbps information rate, or a 109 kbaud symbol rate) for use in HDSL transceiver 113. The incoming 2B1Q signal enters HDSL transceiver 113 from HDSL transformer 215 via line 171. HDSL transceiver 113 converts the incoming or upstream digital 2B1Q signal into a multiplexed binary signal at a transmission rate of 218 kbps for use in multiplexer/framer circuit 111 via line 165, as discussed above. HDSL transceiver 113 sends the multiplexed binary signal (containing data of the receive-direction PCM encoded digital signal for the voice channel, and data of the receive-direction ISDN signal (2B+D), along with framing and messaging data) to multiplexer/framer circuit 111. Multiplexer/framer circuit 111 then demultiplexes the 218 kbps multiplexed binary signal into the separate 64 kbps receive-direction PCM encoded digital signal for the voice channel and the ISDN receive-direction signals, along with the framing data. Codec filter 103 converts the receive-direction PCM encoded digital signal into an analog voice signal for transmission via a line 133 to hybrid transformer 101. Hybrid transformer 101 conditions the analog voice signal and transmits the conditioned analog voice signal via lines 27 to the exchange at the central office. The receive-direction ISDN signal enters ISDN transceiver 107 via line 161 from multiplexer/framer circuit 111. ISDN transceiver 107 sends the receive-direction ISDN signal via line 153 to DSL transformer 105. DSL transformer 105 conditions and converts the 4-wire ISDN signal to 2-wire format for use via twisted pair line 29 at the central office.

B. RT Hardware

Figure 4:
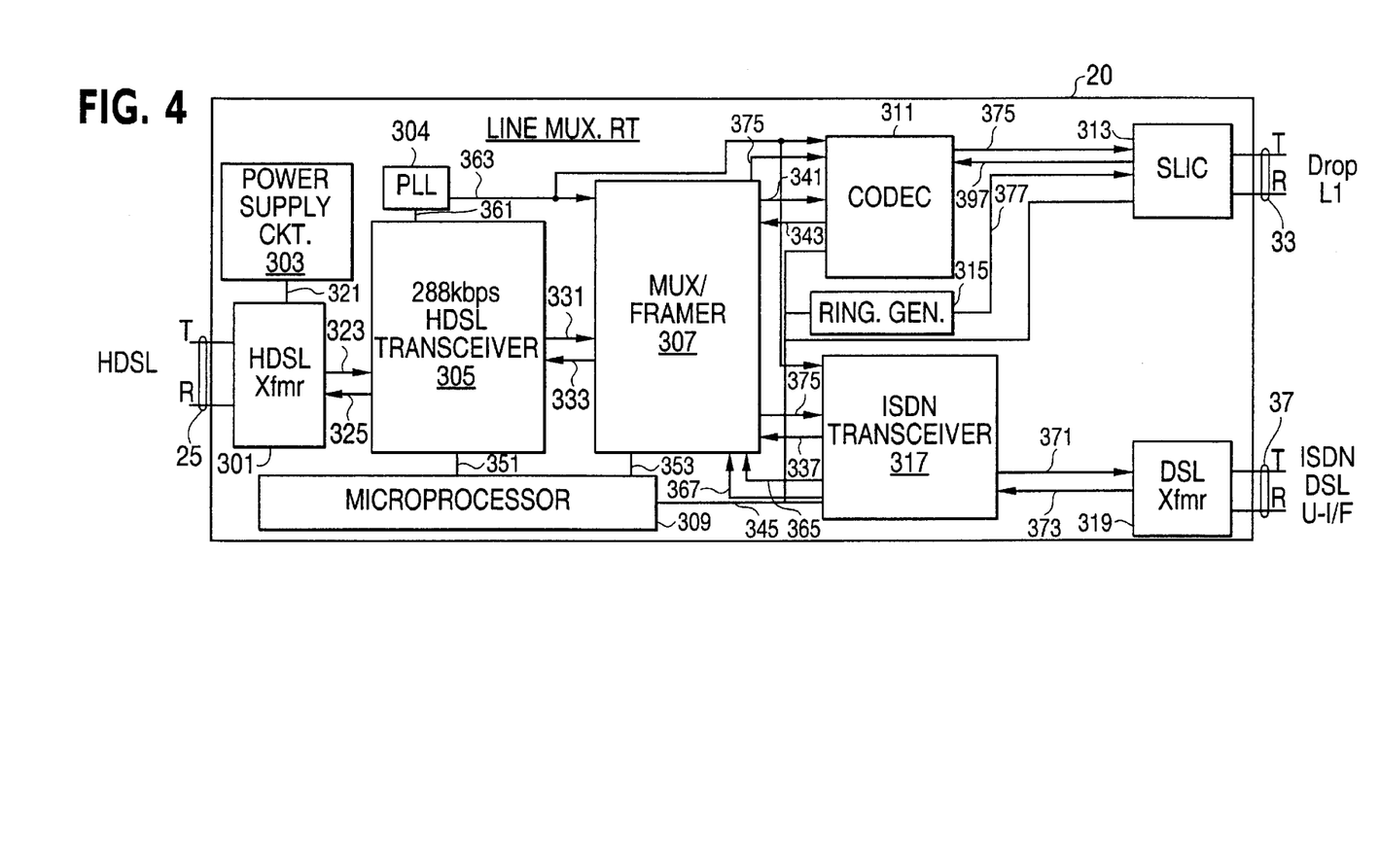
FIG. 4 is a simplified block diagram for an ISDN plus voice remote terminal (RT) 20, according to a specific embodiment of the present invention.

FIG. 4 is a simplified block diagram for RT 20 according to a specific embodiment of the present invention. RT 20 is coupled to LC 15 via single twisted pair HDSL 25. RT 20 includes an HDSL transformer 301, a power supply circuit 303, a phase-locked loop (PLL) circuit 304, an HDSL transceiver circuit 305, a multiplexer/framer circuit 307, a microprocessor 309, a codec (coder-decoder) filter 311, a subscriber line interface circuit (SLIC) 313, a ring generator 315, an ISDN transceiver circuit 317, and a DSL transformer 319, among other elements. RT 20 interfaces with analog signals via twisted pair line 33 and with ISDN signals via twisted pair line 37 at the subscriber location. The ISDN plus voice RT 15 will be first described in reference to ISDN service and voice channel signals coming downstream from a telephone company location, such as the central office, to the subscriber location.

HDSL 25 is coupled to RT 20 via HDSL transformer 301. HDSL transformer 301 performs a 2-wire to 4-wire conversion, conditions and impedance matches the digital 218 kbps 2B1Q signal. Of course, the invention may also be adapted to use, for example, a 4B3T digital signal at a 218 kbps information rate (i.e., a symbol rate of about 164 kbaud). Power supply circuit 303, coupled to HDSL transformer 301 via line 321, extracts line power from HDSL 25 and converts the line power into voltages for powering RT 20. In a specific embodiment, power supply circuit 303 receives about +100 V and −100 V representing transmitted telephone company battery power from HDSL 25 via HDSL transformer 301. Power supply circuit 303 generates about +/−5 V, −24 V, +41 V, −89 V, and −48 V used to supply power to portions of RT 20 from the transmitted telephone company battery power.

HDSL transceiver 305 receives the downstream digital 2B1Q signal via twisted pair line 323 from HDSL transformer 301, and sends an upstream digital 2B1Q signal via twisted pair line 235 to HDSL transformer 301. Similar to that in LC 15, HDSL transceiver 305 performs echo cancellation and adaptive equalization functions, as well as automatic polarity adaption, automatic gain control, and frame and bit synchronized clock recovery functions. HDSL transceiver 305 recovers a clock signal from the HDSL line 25 for use by PLL circuit 304. HDSL transceiver 305 converts the 218 kbps downstream 2B1Q digital signal into a multiplexed binary signal at 218 kbps for transmission via line 331 to multiplexer/framer circuit 307. The multiplexed binary signal includes user data corresponding to receive-direction signals of the voice channel and the 2B+D ISDN service, as well as framing and messaging data. In the upstream direction, HDSL transceiver 305 converts a multiplexed binary signal (including user data corresponding to send-direction signals of the voice channel and the 2B+D ISDN service, as well as framing and messaging data) received from multiplexer/framer circuit 307 via line 333 to a 218 kbps upstream 2B1Q signal.

Multiplexer/framer circuit 308 provides data handling functions including framing and synchronization. In particular, multiplexer/framer circuit 308 demultiplexes the downstream multiplexed binary signal received from HDSL transceiver 305 into the 64 kbps send-direction PCM encoded digital signal on line 341 for use in codec filter 311 and the 160 kbps ISDN signal on line 335 for use in ISDN transceiver 317. Multiplexer/framer circuit 308 also receives the receive-direction PCM encoded digital signal serially transmitted via line 343 from codec filter 311 and the receive-direction ISDN 2B+D signal from ISDN transceiver 317 via line 337. In the upstream direction, multiplexer/framer circuit 307 then multiplexes the 64 kbps receive-direction PCM encoded digital signal from codec filter 311 together with the 160 kbps ISDN signal from ISDN transceiver 317 into a multiplexed binary signal for transmission over line 333 to HDSL transceiver 305. Monitor data, ring data, and other POTS signalling data are polled from codec filter 311 by microprocessor 309 via selected lines 345 coupled to codec filter 311. Similar to that in LC 15, multiplexer/framer circuit 307 in RT 20 may be a custom integrated circuit chip (typically an application specific integrated circuit (ASIC) such as a gate array, a field programmable gate array, or the like). In the specific embodiment, the custom integrated circuit is a Xilinx 3000 Series Programmable Gate Array, but can also be a variety of other integrated circuit chips. In a specific embodiment, multiplexer/framer circuit 307 in RT 20 is similar to multiplexer/framer circuit 111 of LC 15 described above in relation to FIGS. 3(c)–3(d). Appendix II provides an equivalent schematic (Copyright, Unpublished Work, Raychem Corporation) for the Xilinx 3000 Series Programmable Gate Array functions for the ISDN plus voice RT 20 discussed herein, for a specific embodiment.

Microprocessor 309 acts as the main controller of RT 20 and also performs various testing, status, and control functions. Microprocessor 309 is also coupled to control HDSL transceiver 305 via direct control leads 351. Additionally, microprocessor 309 oversees conventional MLT functions, ISDN bypassing (discussed further below) for POTS lifeline service, RT power up and powering status, and alarm status, among others. Furthermore, when a ring signal is sent from LC 15, microprocessor 309 sends an appropriate ring signal encoded in the line control data to cause ring generator 315 to ring the line at RT 20. Also, codec filter 311 may be individually powered down, under the control of microprocessor 309 if a telephone line remains inactive (i.e. on-hook) for a certain amount of time. This results in power savings at the central office. Microprocessor 309, also coupled to multiplexer/framer circuit 307 via lines 353, coordinates the reading and writing to and from memory of the data bytes and bits for ISDN service and voice channel, similar to that discussed for microprocessor 115 in LC 15. In one specific embodiment, microprocessor 309 may be a single microprocessor. However, in other specific embodiments, microprocessor 309 may be comprised of multiple, for example, two microprocessors with split or overlapping responsibilities (e.g., one microprocessor may handle telephony functions while another microprocessor handles the HDSL chip control).

As seen in FIG. 4, PLL circuit 304 in RT 20 takes in the recovered 218 kHz clock signal from HDSL transceiver 305 via line 361. PLL circuit 304 then generates a 2.048 MHz clock signal 363 which is used to drive ISDN transceiver 317 and codec filter 311.

Coupled to multiplexer/framer circuit 307, ISDN transceiver 317 performs selected clock recovery and data formatting operations. In particular, ISDN transceiver 317 recovers a clock signal from the ISDN signal from the subscriber received from DSL transformer 319. The recovered clock signal provides a 2.048 MHz IDL clock and a frame synchronization clock of 8 kHz. In addition to clock recovery, ISDN transceiver 317 performs echo cancellation and adaptive equalization functions. In the specific embodiment, ISDN transceiver 317 may be a commercially available ISDN transceiver, such as a Motorola MC145572 configured as a Line Termination (LT) slave and used in an IDL short frame 8-bit mode. For the downstream direction, a B1 byte, a B2 byte and 2 D bits are transmitted from the multiplexer/framer circuit 307 to ISDN transceiver 317 via line 335, and are clocked by ISDN transceiver 317 using the 2.048 MHz IDL clock signal from ISDN transceiver 317. The 2.048 MHz IDL clock signal and 8 kHz IDL frame synchronization signal from ISDN transceiver 317 are sent to multiplexer/framer circuit 317 over lines 365 and 367, respectively. In the upstream direction, a B1 byte, a B2 byte and 2 D bits from the ISDN signal received from DSL transformer 319 are transmitted by ISDN transceiver 317 to multiplexer/framer circuit 307 via twisted pair line 337. The M channel information is handled by microprocessor 309 over certain control lines 345 coupled to ISDN transceiver 317.

DSL transformer 319 and surrounding resistive elements (not shown) isolate, condition, and impedance match the ISDN signal for use in ISDN transceiver 317. Specifically, DSL transformer 319 converts the ISDN signal from ISDN transceiver 317 from a 4-wire format with send-direction signal on twisted pair line 371 and receive-direction signal on twisted pair line 373 into a 2-wire format on twisted pair line 37. The 2-wire ISDN signal (ISDN DSL U-Interface) on twisted pair line 37 at the subscriber location interfaces with DSL transformer 319 of RT 20.

Codec filter 311 converts the send-direction portion of the PCM encoded digital signal from multiplexer/framer circuit 307 into a send-direction analog signal on twisted pair line 375 for use in SLIC circuit 313. Codec filter 311 also converts a receive-direction signal of the outgoing analog signal from SLIC circuit 313 into a receive-direction PCM encoded digital signal in the upstream direction. The send-direction PCM encoded digital signal is a 64 kbps unipolar TTL binary serial bit stream that enters codec filter 311 via line 375 from multiplexer/framer circuit 307. Codec filter 311 operates on a 2.048 MHz clock signal provided on line 363 by PLL circuit 304 extracted from HDSL 25 from LC 15. Timing control signals are provided to codec filter 311 on line 375 by multiplexer/framer circuit 307 such that the 2.048 MHz clock signal provides the timing with 8 kHz (byte clock) synchronization for the send and receive operation of codec filter 311, and the 64 kHz (bit clock) timing for taking the values of the PCM encoded digital 8-bit words per sample, 8000 times per second. The signalling for the POTS voice channel is handled by microprocessor 309 over selected control lines (collectively shown as line 345) coupled to codec filter 311.

The send-direction analog signal from codec filter 311 enters SLIC circuit 313 via line 375 (the receive-direction analog signals from SLIC circuit 313 enters codec filter 311 via line 377). SLIC circuit 313 conditions the analog telephone signal for use by subscriber equipment, such as a telephone or the like. In particular, SLIC 313 converts the receive-direction and send-direction portions of the analog signal from a 4-wire format to a 2-wire format for use by subscriber equipment. SLIC 313 is also coupled to microprocessor 309 via lines 345.

Ring generator 315 is coupled to SLIC 313 via line 377 through a relay (not shown) and is only connected to SLIC 313 via the appropriate relay when it is desired for a phone to ring, under the direction of microprocessor 309 coupled to ring generator 315. Not active under normal states, ring generator 315 is activated and connected to SLIC 313 via the relay only when a ring signal activation command is transmitted (in digital form) from LC 15 over HDSL 25. Power supply circuit 303 provides general power and ring power to subscriber equipment at appropriate times.

Upstream signals are processed through ISDN plus voice RT 20 in a similar but reverse method as the downstream signals discussed above for RT 20. In particular, SLIC 313 converts the 2-wire analog telephone signal on twisted pair 33 at the subscriber location to 4-wire format for use via twisted pair lines 375 and 377 to codec filter 311. Codec filter 311 converts the receive-direction analog voice signal on line 377 to a receive-direction PCM encoded digital signal for transmission via line 343 to multiplexer/framer circuit 307. A ring signal sent from the subscriber via twisted pair 33 is encoded and transmitted via SLIC 313 to microprocessor 309 for use at the central office. An ISDN signal from the subscriber over twisted pair line 37 is converted from 2-wire to 4-wire format by DSL transformer 319. The receive-direction ISDN signal is sent via twisted pair line 373 to ISDN transceiver 317 for use in multiplexer/framer circuit 307. Under the control of microprocessor 309, multiplexer/framer circuit 307 then multiplexes the receive-direction ISDN signal and the receive-direction PCM encoded digital signal into a multiplexed binary signal with framing and synchronization data. Constructed into a frame by microprocessor 309, the multiplexed binary signal at a transmission rate of 218 kbps is transmitted over line 333 to HDSL transceiver 305. HDSL transceiver 305 then converts the multiplexed binary signal on line 325 into an upstream digital 2B1Q signal sent to HDSL transformer 301 for 4-wire to 2-wire conversion. The upstream 2B1Q signal (which is at a 218 kbps information rate, or a 109 kbaud symbol rate) is sent to HDSL 25 from HDSL transformer 301 which isolates, conditions, and impedance matches the 2B1Q signal for use in HDSL transceiver 113. The 2B1Q signal on HDSL 25 is then used at LC 15 at the telephone company location.

C. LC and RT Components

Without in any way limiting the scope of the invention, Table 1 provides a list of commercially available components which are useful in the operation of the ISDN plus voice LC 15 and ISDN plus voice RT 20 according to the above embodiments. It will be apparent to those of ordinary skill in the art that the components listed in Table 1 are merely representative of those which may be used in association with the inventions herein and are provided for the purpose of facilitating assembly of an apparatus in accord with the invention. A wide variety of components readily known and available to those of ordinary skill in the art could readily be substituted or functionality could be combined or even separated. It should be noted that CMOS-based integrated circuits have been utilized where possible so as to reduce power consumption of the RT in particular.

TABLE 1

ISDN Plus Voice Components

| Component | Part Numbers |
|---|---|
| DSL Transformer | Standard 2B1Q Transformer |
| HDSL Transceiver | Brooktree BT8960 |
| Multiplexer/Framer | Xilinx 3000 Series or ASIC equivalent |
| HDSL Transformer | Pulse Engineering PE68628 |
| Codec Filter | Motorola MC145554 |
| ISDN Transceiver | Motorola MC145572 |
| Hybrid Transformer | Standard Voice Frequency Hybrid Transformer |
| SLIC | Ericcson PBL 3764 A/4 |
| Microprocessor(s) | Motorola MC68302/Intel 87C51FA or 8051 |

III. Software/Microprocessor Functionality

Appendix III provides a program listing (Copyright, Unpublished Work, Raychem Corporation) for application modules used for the ISDN plus voice LC and RT according to a specific embodiment. The code is adapted for and has been used on a Motorola processor mentioned above, although it will be apparent that the invention could be applied to a wide variety of such processor. Again, however, a wide variety of microprocessors could be used herein without departing from the scope of the invention.

IV. Bypass To POTS

Figure 5:
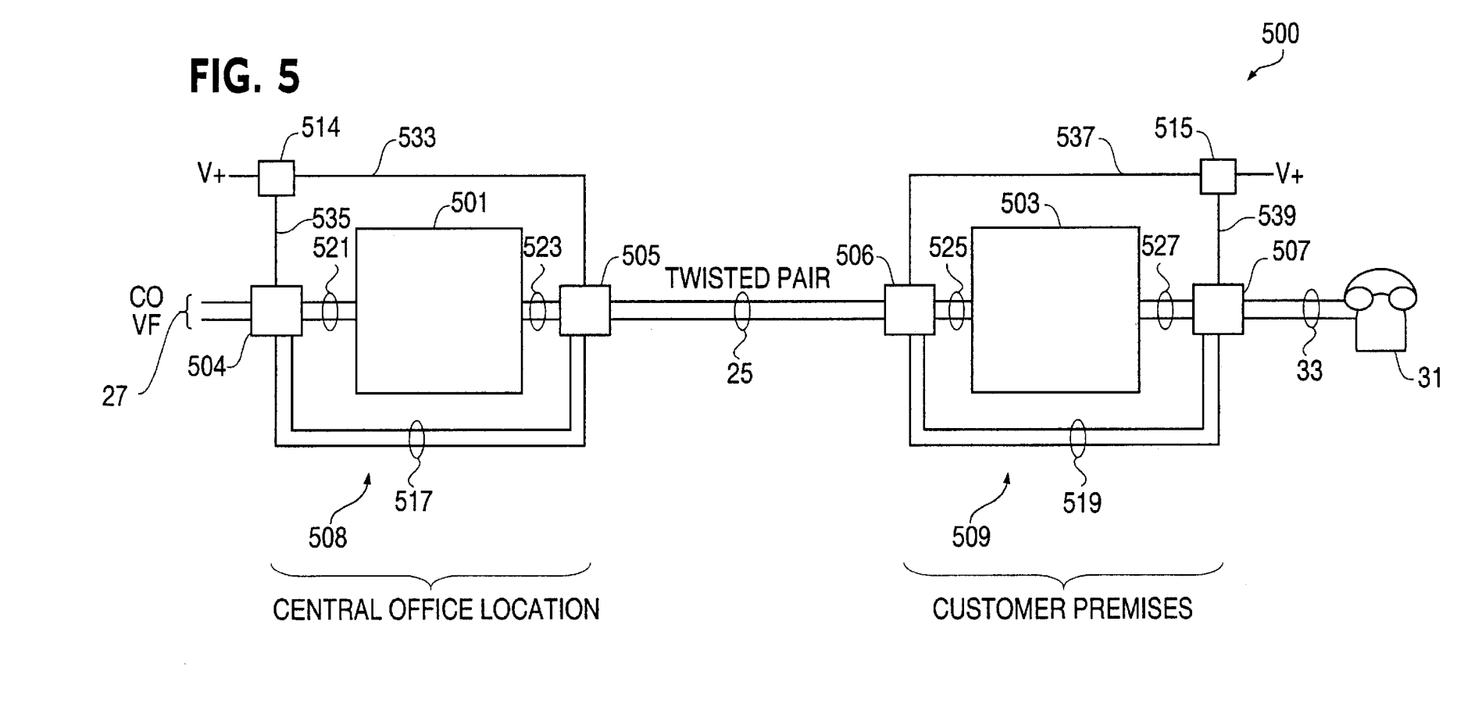
FIG. 5 is a detailed diagram of the bypass circuitry for LC 15 and RT 20 that enables provision of analog telephone service with central office line power to RT 20 at the subscriber location, in accordance with a specific embodiment of the present invention.

The system described above also includes bypass circuits to change the multiplexed ISDN-plus-voice use of the single twisted pair 25 to the transmission of plain old telephone services (POTS) during power failure or when the system experiences an inability to sustain a linked condition between the normal mode RT circuit 503 and the normal mode LC circuit 501 (e.g., HDSL link is non-operational). FIG. 5 is a simplified block diagram of the bypass circuitry 500 according to a specific embodiment of the present invention. The block diagram of FIG. 5 includes ISDN plus voice LC normal mode circuit elements 501 and ISDN plus voice RT normal mode circuit elements 503, LC relays 504 and 505, RT relays 506 and 507, voltage sensors 514 and 515, LC bypass twisted pair line 517, and RT bypass twisted pair line 519. These normal mode circuit elements 501 and 503 are similar to the elements in the LC 15 and RT 20, respectively, as described in detail above.

During normal operation of the ISDN plus voice LC and RT system, the LC relays 504 and 505 of bypass circuitry 500 allow the analog telephone signal 27 from the central office to operate with the normal mode circuit elements 501 of the ISDN plus voice LC 15 via twisted pair line 521 and twisted pair line 523; and the RT relays 506 and 507 of bypass circuitry 500 allow the digitally encoded signal on HDSL 25 to operate with the normal mode circuit elements 503 of the ISDN plus voice RT 20 via twisted pair line 525 and twisted pair line 527.

Upon failure of HDSL link, the LC bypass circuit 508 bypasses the incoming analog telephone signal from line 27 around the normal mode LC circuit elements 501 to the single twisted pair telephone line 25. Twisted pair line 25 is thus used as a conventional analog telephone line, instead of as HDSL 25 for ISDN plus voice use according to embodiments of the invention. In particular, upon power failure the voltage V+ sensed at the voltage sensor 514 goes to zero, and the voltage sensor 514 sends control signals via lines 533 and 535 to LC relays 504 and 505, respectively, to bypass the incoming analog telephone signals to bypass twisted pair line 517. The LC relays 504 and 505 isolate the bypassed analog telephone signal from the normal mode circuit elements 501.

The RT bypass circuit 509 operates in a similar manner as the LC bypass circuit described above. Since RT 20 receives its power from the single twisted pair 25 during normal mode operation, power failure or HDSL link failure at the LC 15 also results in power failure or HDSL link failure at the RT 20. During such failure, the incoming analog telephone signal from the twisted pair telephone line 25 bypasses the normal mode RT circuit elements 503 to the telephone 31 (see also FIG. 1). The voltage V+ sensed at the voltage sensor 511 goes to zero during power failure, and control signals via lines 537 and 539 enter RT relays 506 and 507, respectively. The RT relays 506 and 507 then bypass the incoming analog telephone signal from the twisted pair 25 via bypass twisted pair line 519 to the telephone 31 via twisted pair line 33 coupled to RT relay 507. The RT relays 506 and 507 also isolate the normal mode RT circuit elements 503 from the bypassed analog telephone signals. The RT and the LC bypass circuits allow the user to rely upon plain old telephone services during power or HDSL failure.

It should also be recognized that although the above bypass scenarios are discussed for an incoming analog telephone signal from twisted pair line 27 from the central office toward the subscriber, a similar description also applies for outgoing analog telephone signals from the subscriber equipment 31 toward the central office.

V. Conclusion

While the above is a full description of the specific embodiments, various modifications, alternative constructions, and equivalents may be used. For example, while the description above is in terms of converting ISDN service and an analog voice channel for use on a single twisted pair using specific components, it would be possible to implement the present invention with other components and configurations. Further, while the specific embodiment describes a system with ISDN service plus voice telephone service, other specific embodiments may include multiple ISDN signals (for multiple 2B+D service per ISDN signal) with at least one or more voice telephone service for further added services and pair gain. Therefore, the above description and illustrations should not be taken as limiting the scope of the present invention which is defined by the appended claims.

What is claimed is:

1. A method of concurrently transmitting and receiving signals representing at least one voice channel and at least ISDN (2B+D) service over a single twisted pair between a first location and a second location, said method comprising steps of:

providing at least one analog telephone signal and at least one ISDN signal at a first location;

converting said analog telephone signal into a first binary signal;

combining said first binary signal and said ISDN signal to a higher rate multiplexed binary signal;

converting said higher rate multiplexed binary signal into a digitally encoded signal, said digitally encoded signal being selected from the group consisting of 2B1Q and 4B3T signals;

sending line power over said single twisted pair;

transferring said digitally encoded signal to said second location over said single twisted pair;

detecting failure of said transferring of said digitally encoded signal between said first location and said second location to thereby impose a bypass lifeline and provide said analog telephone signal at said second location over said single twisted pair; and providing said ISDN signal and said analog telephone signal at said second location over said single twisted pair when said failure of said transferring of said is not detected.

2. The method of claim 1 wherein said higher rate multiplexed binary signal is about 218 kbps.

3. The of claim 1 wherein said digitally encoded signal is about 109 kbps.

4. The method of claim 1 wherein said single twisted pair is at least 17 kilo-feet.

5. The method of claim 1 further comprising steps of:
at said second location:
receiving said digitally encoded signal from said single twisted pair;
converting said digitally encoded signal to said higher rate binary signal;
separating said first binary signal and said ISDN signal from said higher rate multiplexed binary signal; and
converting said first binary signal into said analog telephone signal and said ISDN signal for use at said second location.

6. The method of claim 5 wherein said steps at said second location occur in a detachable remote terminal unit.

7. The method of claim 1 wherein said first location is a telephone company location and said second location is a location between said telephone company location and a subscriber location.

8. The method of claim 1 wherein said second location is a telephone company location and said first location is a location between said telephone company location and a subscriber location.

9. The method of claim 1 wherein said first location is a telephone company location and said second location is a subscriber location.

10. The method of claim 7 wherein said second location is near a subscriber location, said subscriber location comprising a home or office.

11. The method of claim 1 wherein said second location is a telephone company location and said first location is a subscriber location.

12. The method of claim 8 wherein said first location is near a subscriber location, said subscriber location comprising a home or office.

13. Apparatus for concurrent transmission and reception of signals from at least one voice channel and at least one ISDN (2B+D) service between a first location and a second location over a single twisted pair, said apparatus comprising:

at least one analog telephone signal source and at least one ISDN signal source at a first location;

a multiplexing unit at said first location, said multiplexing unit converting said analog telephone signal into a first binary signal, combining said first binary signal with said ISDN signal into a higher rate multiplexed binary signal, converting said higher rate multiplexed binary signal into a digitally encoded signal, said digitally encoded signal providing concurrent transmission and reception between said first and said second locations over said single twisted pair, said digitally encoded signal selected from the group consisting of 2B1Q and 4B3T signals; and wherein said multiplexing unit includes a bypass circuit for providing said analog telephone signal to said second location over said single-twisted pair if transmission of said digitally encoded signal is detected to have failed on said single twisted pair.

14. The apparatus of claim 13 wherein said digitally encoded signal is about 109 kbps.

15. The apparatus of claim 14 wherein said higher rate multiplexed binary signal is about 218 kbps.

16. The apparatus of claim 15 wherein said single twisted pair line is a 17 kilo-feet.

17. The apparatus of claim 13 wherein said first location is a telephone company location and said second location is a location between said telephone company location and a subscriber location, and said multiplexing unit comprises a detachable line unit.

18. The apparatus of claim 13 wherein said second location is a telephone company location and said first location is a location between said telephone company location and a subscriber location, and said multiplexing unit comprises a remote terminal unit.

19. The apparatus of claim 13 wherein said first location is a telephone company location and said second location is a location comprises a subscriber location, and said multiplexing unit comprises a detachable line unit.

20. The apparatus of claim 13 wherein said second location is a telephone company location and said first location comprises a subscriber location, and said multiplexing unit comprises a remote terminal unit.

* * * * *